(12) United States Patent
Moore (10) Patent No.: US 11,033,004 B2
(45) Date of Patent: Jun. 15, 2021

(54) LEASH WITH VARIABLE ANCHOR

(71) Applicant: Jacqueline Moore, Los Angeles, CA (US)

(72) Inventor: Jacqueline Moore, Los Angeles, CA (US)

( * ) Notice: Subject to any disclaimer, the term of this patent is extended or adjusted under 35 U.S.C. 154(b) by 390 days.

(21) Appl. No.: 15/614,576

(22) Filed: Jun. 5, 2017

(65) Prior Publication Data

US 2018/0199547 A1 Jul. 19, 2018

Related U.S. Application Data

(63) Continuation-in-part of application No. 15/406,551, filed on Jan. 13, 2017, now abandoned, and a continuation-in-part of application No. 29/601,888, filed on Apr. 26, 2017, now Pat. No. Des. 882,883.

(51) Int. Cl.
*A01K 27/00* (2006.01)
*A01K 1/04* (2006.01)

(52) U.S. Cl.
CPC .............. *A01K 27/005* (2013.01); *A01K 1/04* (2013.01); *A01K 27/003* (2013.01); *A01K 27/001* (2013.01)

(58) Field of Classification Search
CPC .. A01K 27/003; A01K 27/005; A01K 27/004; A01K 1/04
USPC ................. 119/795, 792, 797, 863
See application file for complete search history.

(56) References Cited

U.S. PATENT DOCUMENTS

| 535,032 | A | * | 5/1895 | Valleau | .......................... 119/789 |
|---|---|---|---|---|---|
| 5,099,799 | A | | 3/1992 | Giacobbe | |
| 6,085,696 | A | * | 7/2000 | Fisher | .................. A01K 27/003 119/798 |
| 6,662,753 | B1 | | 12/2003 | Sporn | |
| 6,675,742 | B1 | | 1/2004 | Shiraki | |
| D838,060 | S | | 1/2019 | Bitar | |
| 2006/0042562 | A1 | | 3/2006 | Wagner | |
| 2009/0320769 | A1 | | 12/2009 | McCay | |
| 2011/0000440 | A1 | | 1/2011 | Mucerino | |
| 2013/0074783 | A1 | | 3/2013 | Chapin | |
| 2014/0096721 | A1 | | 4/2014 | Millard | |
| 2015/0033542 | A1 | | 2/2015 | Miron | |

(Continued)

OTHER PUBLICATIONS

"Ruffwear Roamer Leash for Pets". Found online Apr. 16, 2018 at amazon.ca Page dated Jan. 21, 2014. Retrieved from https://www.amazon.ca/Ruffwear-Roamer-Leash-Medium-Purple/dp/B00HE4Y5M4/ref=sr_1_1?ie=UTF8&qid=1523899482&sr=8-1&keywords=ruffwear+roamer.

(Continued)

*Primary Examiner* — Peter M Poon
*Assistant Examiner* — Jeffrey R Larsen
(74) *Attorney, Agent, or Firm* — Eric Kelly (57) ABSTRACT

A leash-with-variable-anchor may have two opposing fastener structures, one for removable attachment to a collar or to a harness; and another for fastening back onto a portion of leash-with-variable-anchor, forming a closed looped structure, an anchor. The anchor may function as a handle. The anchor may also be quickly, easily, and safely attached to various articles, such as, but not limited to, posts; and without a need of detaching from the collar or from the harness. In some embodiments, the loop structure of the anchor may be variable (i.e., adjustable) in size. In some embodiments, at least portions of loop structure of the anchor may elastic.

15 Claims, 10 Drawing Sheets

(56) References Cited

U.S. PATENT DOCUMENTS

2016/0015002 A1* 1/2016 Huegel ................ A01K 27/003
119/795
2017/0049078 A1 2/2017 Farrar
2017/0280686 A1 10/2017 Cory
2018/0070562 A1 3/2018 Hsieh
2018/0116179 A1 5/2018 Gonterman

OTHER PUBLICATIONS

"Stunt Puppy Stunt Runner Hands-Free Dog Leash". Found online Nov. 8, 2017 at amazon.com. Page dated May 19, 2011. Retrieved from https://www.amazon.com/Stunt-Puppy-Runner-Hands-Free-Silver/dp/B004VOWRIO/ref=cm_cr_arp_d_product_top?ie=UTF8.

* cited by examiner

LEASH WITH VARIABLE ANCHOR

PRIORITY NOTICE

The present patent application is a continuation-in-part (CIP) of U.S. non-provisional patent application Ser. No. 15/406,551 filed on Jan. 13, 2017; wherein this present patent application claims priority to said U.S. non-provisional patent application under 35 U.S.C. § 120. The above-identified parent U.S. non-provisional patent application is incorporated herein by reference in their entirety as if fully set forth below.

The present patent application is a continuation-in-part (CIP) of U.S. non-provisional patent application Ser. No. 29/601,888 filed on Apr. 26, 2017; wherein this present patent application claims priority to said U.S. non-provisional patent application under 35 U.S.C. § 120. The above-identified parent U.S. non-provisional patent application is incorporated herein by reference in their entirety as if fully set forth below.

TECHNICAL FIELD OF THE INVENTION

The present invention relates in general to leashes and more specifically to leashes for pets, such as dogs, and wherein such leashes have a variable anchor that may removably attach to various articles and that may serve as a handle.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Currently (circa 2016), leashes, as in dog leashes, typically have a clip end for attachment to a collar and an opposing integral handle. It is often desirable to attach such leashes to an article, such as a post. One may have a need to be hands-free from the least, for example, to sit down and drink a beverage, eat, read, converse, and the like. To attach such leashes to the article one either has to physically tie the leash to the article; or one must pass a portion of the leash around the article, remove the pet from the clip end, pass the clip end through the handle, and then re-attach the clip end back to the pet. And to detach such a leash from the article the above steps must be repeated, in reverse. Thus, presently using such existing leashes to attach to the article is cumbersome and awkward, especially when one is already holding something in one hand; and may provide a safety issue, when the clip end is detached from the pet. It would be desirable to have a leash that may be removably anchored (i.e., attached) to such an article, in a manner that is quick, easy, and safe.

There then is a need in the art for a leash may be removably anchored (i.e., attached) to such an article, in a manner that is quick, easy, and safe.

It is to these ends that the present invention has been developed.

BRIEF SUMMARY OF THE INVENTION

To minimize the limitations in the prior art, and to minimize other limitations that will be apparent upon reading and understanding the present specification, the present invention describes embodiments of a leash-with-variable-anchor that may comprise two opposing fastener structures, one for removable attachment to a collar or to a harness; and another for fastening back onto a portion of an elongate-member of the leash-with-variable-anchor, forming a looped structure, an anchor. The anchor may function as a handle. The anchor may also be quickly, easily, and safely attached to various articles, such as, but not limited to, posts; and without a need of detaching from the collar or from the harness. In some embodiments, the loop structure of the anchor may be variable (i.e., adjustable) in size.

It is an objective of the present invention to provide a leash that may be removably attached to an article, such as, but not limited to, a post, without having to detach the leash from a collar or from a harness.

It is another objective of the present invention to provide a leash that may be removably attached to an article without having to detach the leash from a collar or from a harness, in a manner that may be quick, easy, and safe.

It is yet another objective of the present invention to provide a leash with article attachment structure, an anchor, wherein a size of the anchor may be variable (i.e., adjustable).

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

REFERENCE NUMERAL SCHEDULE 100 leash-with-variable-anchor 100
101 elongate-member 101
103 first-terminal-end 103
105 second-terminal-end 105
107 first-clip 107
109 second-clip 109
111 at least one hole 111
115 size-adjuster 115
200 leash-with-variable-anchor 200
201 elongate-member 201
203 first-terminal-end 203
205 second-terminal-end 205
207 first-fastener 207
209 second-fastener 209
211 second-fastener-receiver 211
217 anchor 217
300 leash-with-variable-anchor 300
301 elongate-member 301
303 first-terminal-end 303
305 second-terminal-end 305
317 anchor 317
319 elastic-elongate-member 319
321 handle-member 321
600 method 600
601 wrapping elastic-elongate-member around article 601
603 attaching fastener-hardware together to form anchor 603
605 attaching first-fastener to collar or harness 605
700 method 700
701 locating article within anchor 701
703 attaching fastener-hardware together so anchor closed 703
901 pet 901
903 tree trunk 903
905 article 905
907 collar 907

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Figure 1:
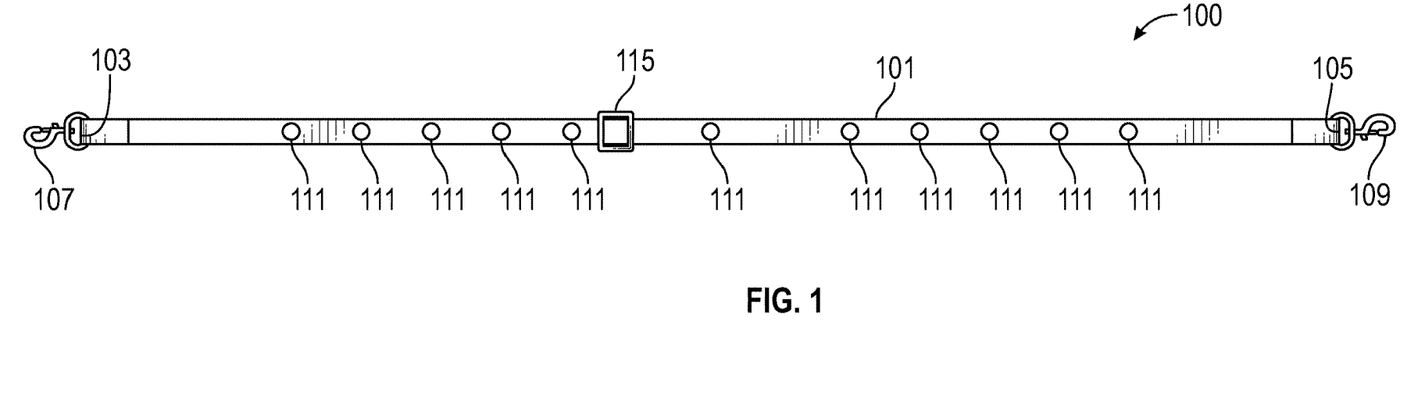
FIG. 1 may depict an embodiment of a leash-with-variable-anchor, as viewed from above with the leash-with-variable-anchor laid out in longitudinally extended configuration.

FIG. 1 may depict an embodiment of a leash-with-variable-anchor 100, as viewed from above with leash-with-variable-anchor 100 laid out in longitudinally extended configuration. In some embodiments, leash-with-variable-anchor 100 may comprise: an elongate-member 101, a first-clip 107, and a second-clip 109. In some embodiments, elongate-member 101 may be substantially flexible. In some embodiments, elongate-member 101 may comprise two opposing terminal-ends, a first-terminal-end 103 and a second-terminal-end 105. In some embodiments, first-clip 107 may be attached to first-terminal-end 103. In some embodiments, second-clip 109 may be attached to second-terminal-end 105. In some embodiments, first-clip 107 or second-clip 109 may be removably attachable to a collar or to a harness. In some embodiments, first-clip 107 or second-clip 109 may be spring loaded clips. In some embodiments, first-clip 107 or second-clip 109 may be substantially constructed from one or more metals.

Continuing discussing FIG. 1, in some embodiments, leash-with-variable-anchor 100 may comprise at least one hole 111. In some embodiments, elongate-member 101 may comprise at least one hole 111. In some embodiments, at least one hole 111 may be located in elongate-member 101. In some embodiments, at least one hole 111 may pass entirely through a thickness of elongate-member 101. In some embodiments, at least one hole 111 may be sized to removably receive attachment of first-clip 107 or of second-clip 109. In some embodiments, when first-clip 107 or second-clip 109 may be removably attached to at least one hole 111, an anchor may be formed. In some embodiments, this anchor may be a looped structure. In some embodiments, this anchor may be removably attachable to an article by the anchor wrapping around a portion of the article.

For example, and without limiting the scope of the present invention, this article may be a post, a sign post, a light post, a pole, a telephone pole, a table leg, a bench leg, a table pedestal, a chair leg, a tree trunk, a gate post, a frame member, a structural member, and/or the like. The article may generally be a solid object that a portion of elongate-member 101, i.e., the anchor, may be wrap around. For example, and without limiting the scope of this present invention, a tree trunk 903 as the article may be shown in FIG. 4. For example, and without limiting the scope of this present invention, article 905 as a frame of furniture may be shown in FIG. 5.

In some embodiments, the anchor is a handle. That is, the anchor, once formed, may function as a handle, so that a user may easily hold leash-with-variable-anchor 100.

Continuing discussing FIG. 1, in some embodiments, at least one hole 111 may be selected from one to twenty holes. For example, and without limiting the scope of the present invention, as shown in FIG. 1, elongate-member 101 may comprise eleven holes 111, with one hole 111 located in a middle of a length of elongate-member 101. Because of such a plurality of holes 111, then a size of the anchor may be variable depending upon which hole 111 that first-clip 107 or that second-clip 109 removably attaches to. In some embodiments, at least one hole 111 may be reinforced with one grommet for each of at least one hole 111. In some embodiments, at least one hole 111 may be located a predetermined distance from first-terminal-end 103 (and/or from second-terminal-end 105). For example, and without limiting the scope of the present invention, a first hole 111 (i.e., closest) from first-terminal-end 103 may be located at about 18 inches from first-terminal-end 103; wherein "about" in this context may mean plus or minus two inches. For example, and without limiting the scope of the present invention, a first hole 111 (i.e., closest) from second-terminal-end 105 may be located at about 18 inches from second-terminal-end 105; wherein "about" in this context may mean plus or minus two inches.

Continuing discussing FIG. 1, in some embodiments, leash-with-variable-anchor 100 may comprise a size-adjuster 115. In some embodiments, size-adjuster 115 may be slidingly attached to elongate-member 101. In some embodiments, size-adjuster 115 may permit a length of elongate-member 101 to be adjusted. In some embodiments, size-adjuster 115 may be a triglide slider. In some embodiments, size-adjuster 115 may be constructed from a thermoplastic.

Continuing discussing FIG. 1, in some embodiments, elongate-member 101 may be longer than wide, and wider than thick. In some embodiments, elongate-member 101 may be webbing or strapping. That is, in some embodiments, elongate-member 101 may be a woven structure, of natural, synthetic, or blended fabric or fibers. Some natural materials of construction for elongate-member 101 may comprise: cotton, silk, hemp, linen, leather, and/or the like. Some synthetic materials of construction for elongate-member 101 may comprise: nylon, polyester, acrylic, polypropylene, and/or the like. In some embodiments, all or portions of elongate-member 101 may be constructed from recycled materials of construction.

Continuing discussing FIG. 1, in some embodiments, first-terminal-end 103 and first-clip 107 may be substantially structurally symmetrical to second-terminal-end 105 and to second-clip 109.

Figure 2:
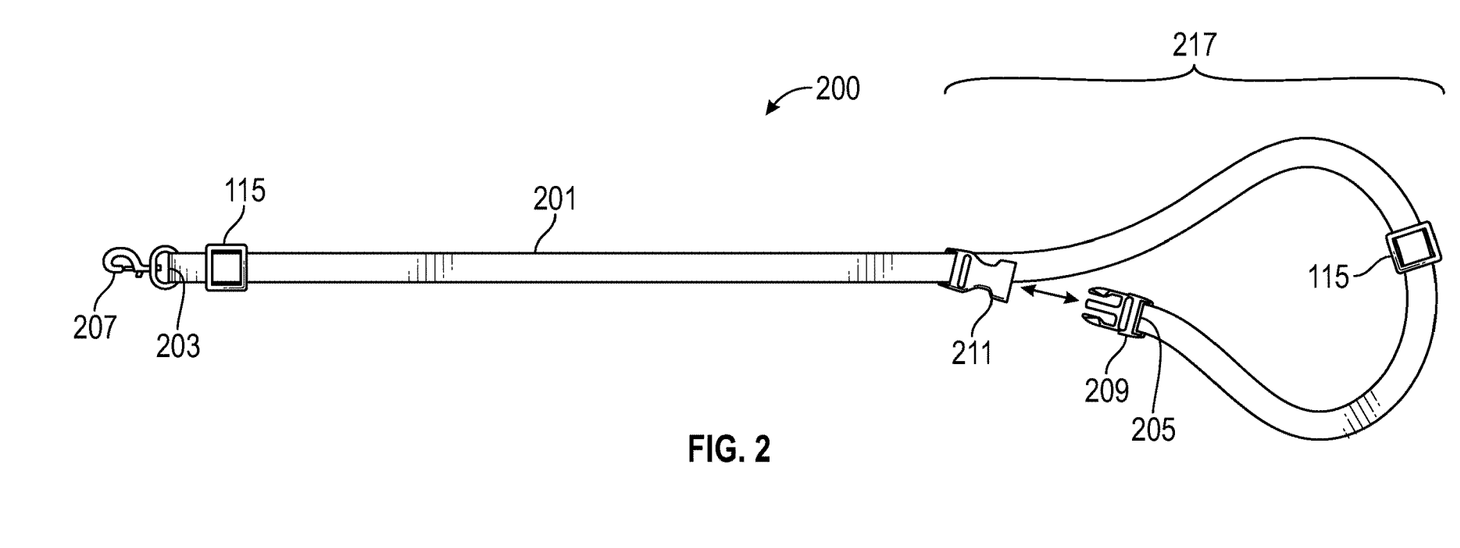
FIG. 2 may depict an embodiment of a leash-with-variable-anchor, as viewed from above with the leash-with-variable-anchor laid out in a substantially longitudinally extended configuration, but showing a looping structure in a process of forming an anchor.

FIG. 2 may depict an embodiment of a leash-with-variable-anchor 200, as viewed from above with leash-with-variable-anchor 200 laid out in a substantially longitudinally extended configuration, but showing a looping structure in a process of forming an anchor 217. In some embodiments, leash-with-variable-anchor 200 may comprise an elongate-member 201, a first-fastener 207, a second-fastener 209, and a second-fastener-receiver 211.

Continuing discussing FIG. 2, in some embodiments, elongate-member 201 may be substantially flexible. In some embodiments, elongate-member 201 may comprise two opposing terminal-ends, a first-terminal-end 203 and a second-terminal-end 205. In some embodiments, elongate-member 201 may be longer than wide, and wider than thick. In some embodiments, elongate-member 201 may be webbing or strapping.

In some embodiments, elongate-member 201 may be substantially similar, in terms of structure and/or in terms of function, to elongate-member 101. For example, both elongate-member 201 and elongate-member 101 may have an overall same structure of an elongate member that is longer than wide, and wider than thick, that may be substantially flexible; that may be webbing or strapping; and that may be constructed from same materials of construction. However, some embodiments of elongate-member 201 may not include at least one hole 111. (Although some embodiments of elongate-member 201 may comprise at least one hole 111, wherein such embodiments are not depicted in the figures.)

Continuing discussing FIG. 2, in some embodiments, first-fastener 207 may be attached to first-terminal-end 203. In some embodiments, first-fastener 207 may be substantially similar, structurally and/or functionally, to first-clip 107 and/or to second-clip 109. In some embodiments, first-fastener 207 may be removably attachable to a collar or to a harness.

Continuing discussing FIG. 2, in some embodiments, second-fastener 209 may be attached to second-terminal-end 205. In some embodiments, second-fastener-receiver 211 may be attached to elongate-member 201. In some embodiments, second-fastener-receiver 211 may be slidingly attached to elongate-member 201. In some embodiments, second-fastener 209 may be removably attachable to second-fastener-receiver 211. In some embodiments, when second-fastener 209 may be removably attached to second-fastener-receiver 211, an anchor 217 may be formed. In some embodiments, this anchor 217 may be a looped structure, i.e., a looped structure of a portion of elongate-member 201. In some embodiments, this anchor 217 may be removably attachable to the article by anchor 217 wrapping around a portion of the article. Examples of some articles are noted above. In some embodiments, this anchor may be a handle of leash-with-variable-anchor 200.

Continuing discussing FIG. 2, in some embodiments, together second-fastener 209 and second-fastener-receiver 211 may form a quick release buckle. In some embodiments, such a quick release buckle may be substantially constructed from a thermoformed plastic. Note it is expressly contemplated that in some embodiments, a male portion of such a quick release buckle may be second-fastener 209; and that the receiving female portion of such a quick release buckle may be second-fastener-receiver 211. However, it is also expressly contemplated that in some embodiments, a male portion of such a quick release buckle may be second-fastener-receiver 211; and that the receiving female portion of such a quick release buckle may be second-fastener 209.

Continuing discussing FIG. 2, in some embodiments, second-fastener-receiver 211 may be located at about 10 inches to about 24 inches from second-terminal-end 205; wherein "about" in this context may be mean plus or minus two inches. In some embodiments, second-fastener-receiver 211 may be located at about 18 inches from second-terminal-end 205; wherein "about" in this context may be mean plus or minus two inches.

Continuing discussing FIG. 2, in some embodiments, leash-with-variable-anchor 200 may comprise at least one size-adjuster 115. In some embodiments, at least one size-adjuster 115 may be slidingly attached to elongate-member 201. In some embodiments, at least one size-adjuster 115 may permit a length of elongate-member 201 to be adjusted. In some embodiments, at least one size-adjuster 115 may comprise two size-adjusters 115, one disposed between first-terminal-end 203 and second-fastener-receiver 211; and a second disposed between second-fastener-receiver 211 and second-terminal-end 205.

Continuing discussing FIG. 2, in some embodiments, anchor 217 may be variable in size by either sliding second-fastener-receiver 211 along a length of elongate-member 202 or by adjusting a length of anchor 217 by using size-adjuster 115 that may be attached to elongate-member 201 disposed between second-terminal-end 205 and second-fastener-receiver 211.

Figure 3A:
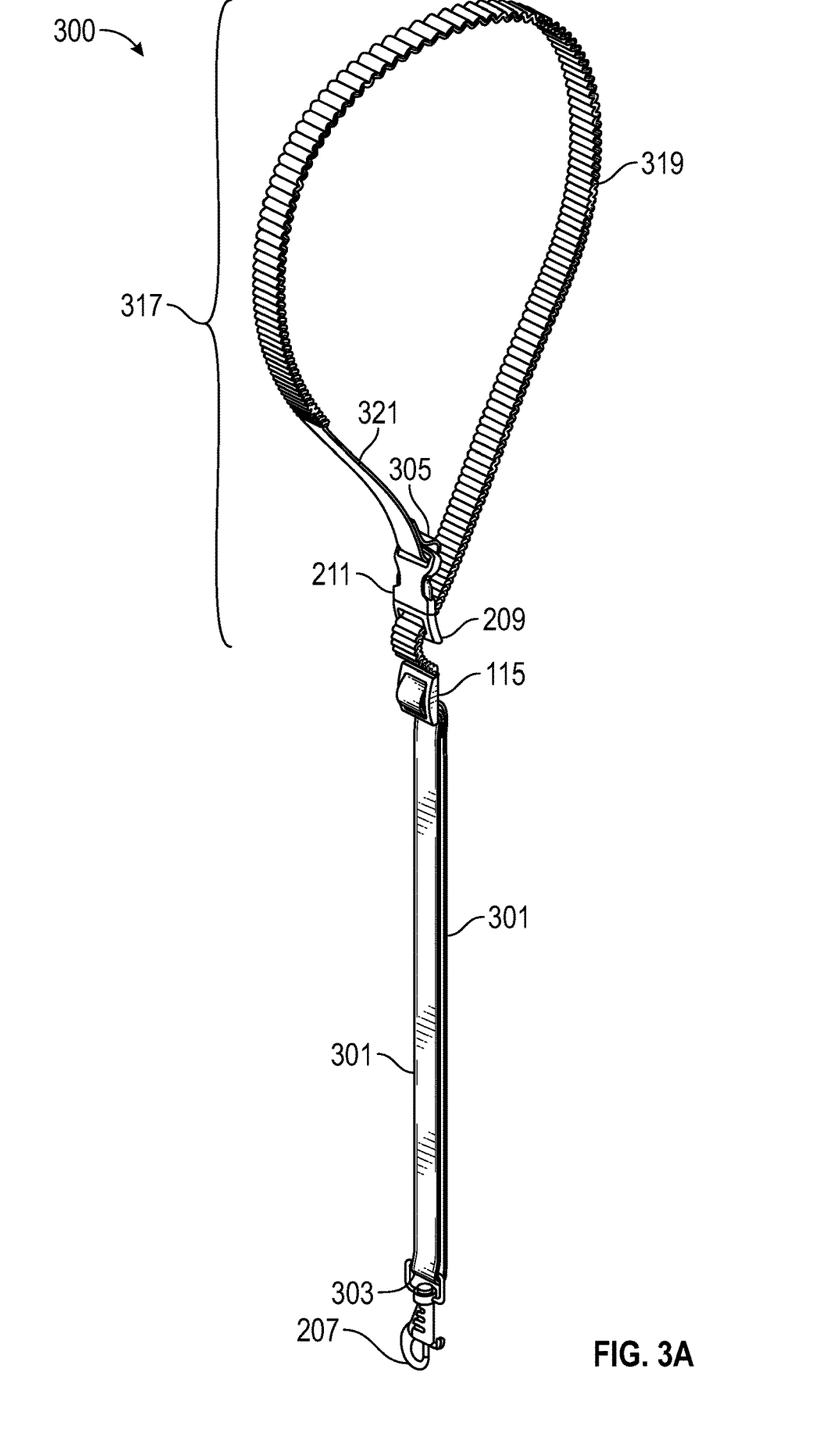
FIG. 3A may depict an embodiment of a leash-with-variable-anchor, as viewed from a perspective view.
Figure 3B:
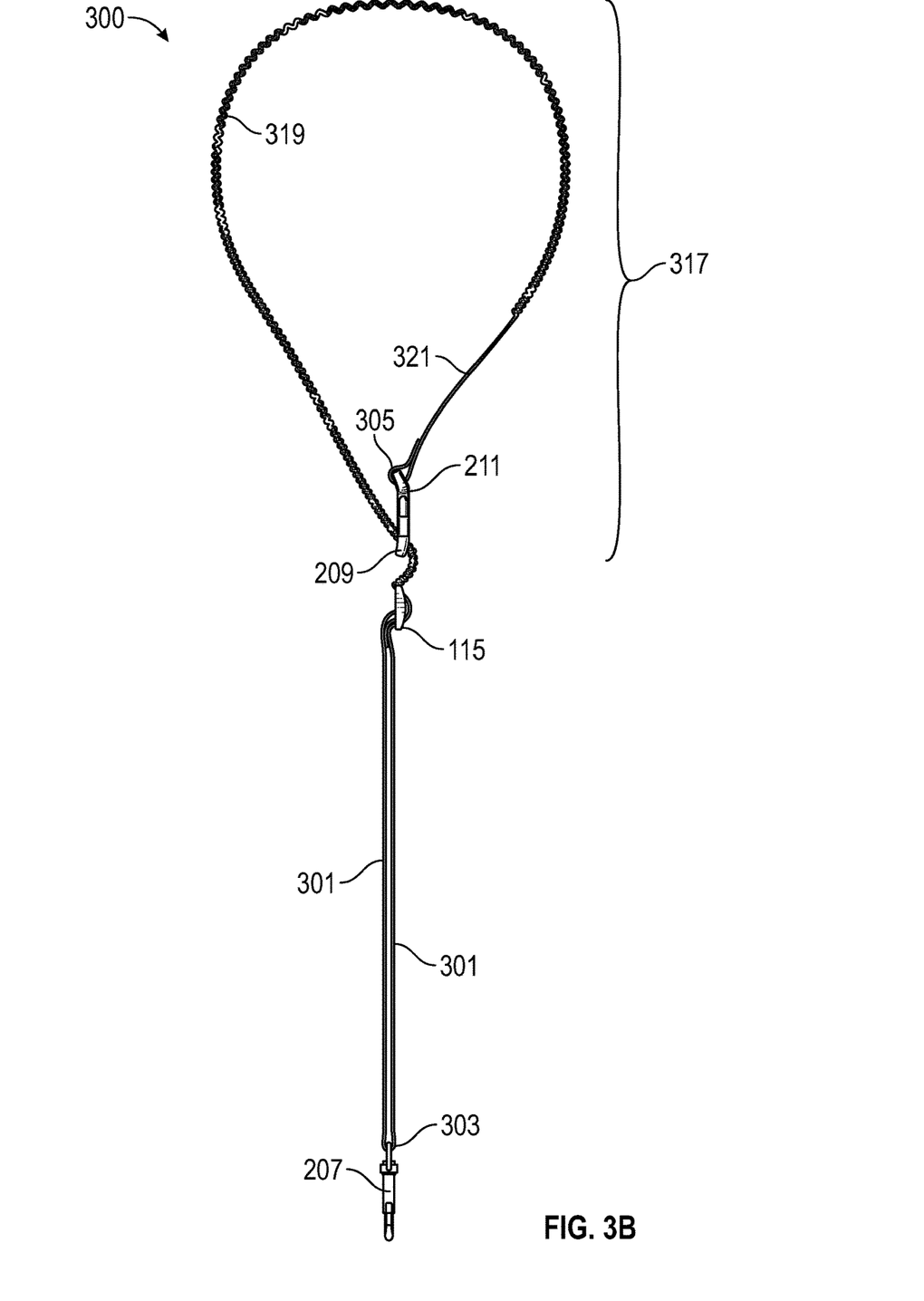
FIG. 3B may depict the leash-with-variable-anchor from FIG. 3A, as viewed from a left-side view.
Figure 3C:
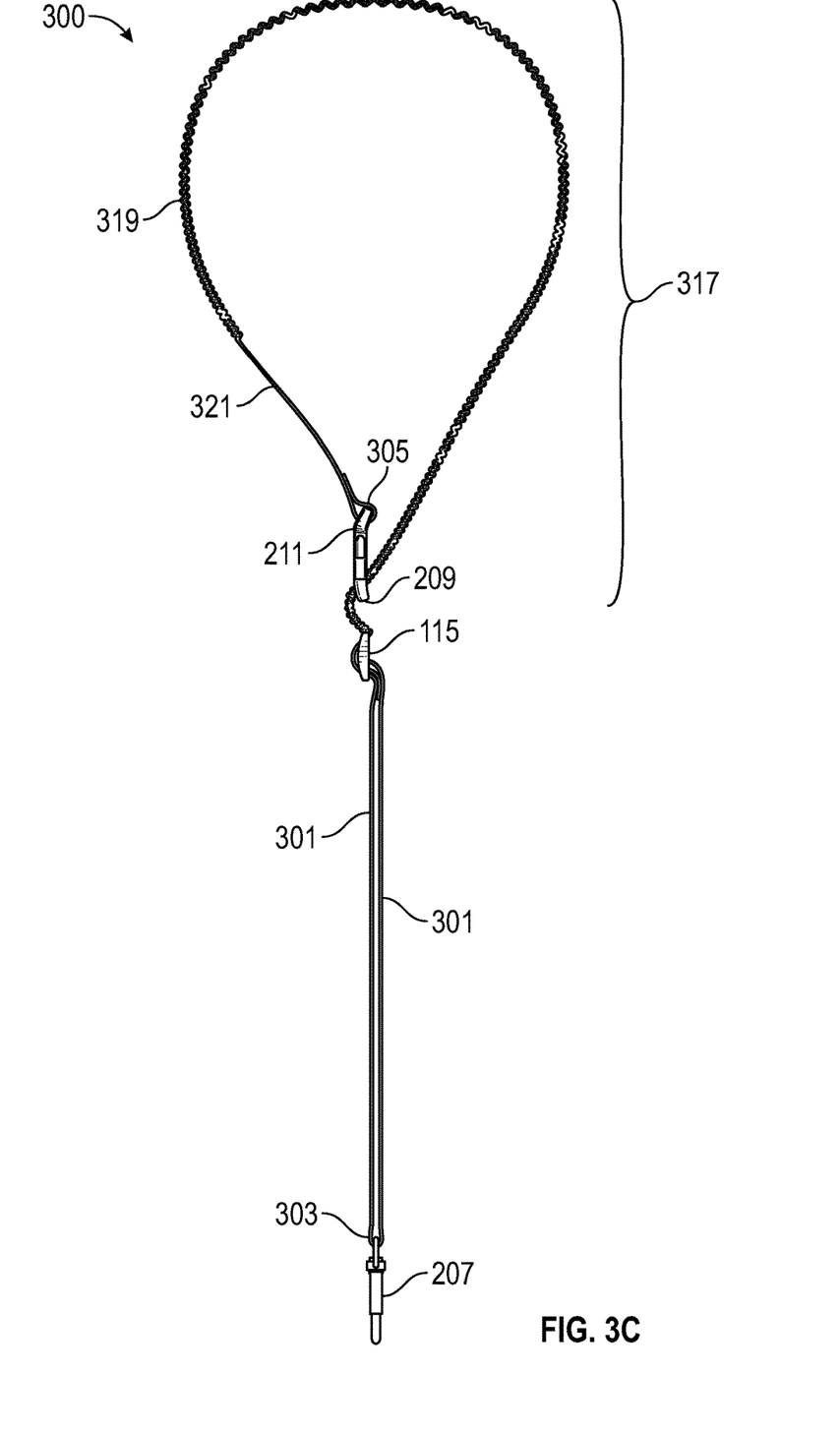
FIG. 3C may depict the leash-with-variable-anchor from FIG. 3A, as viewed from a right-side view.
Figure 3D:
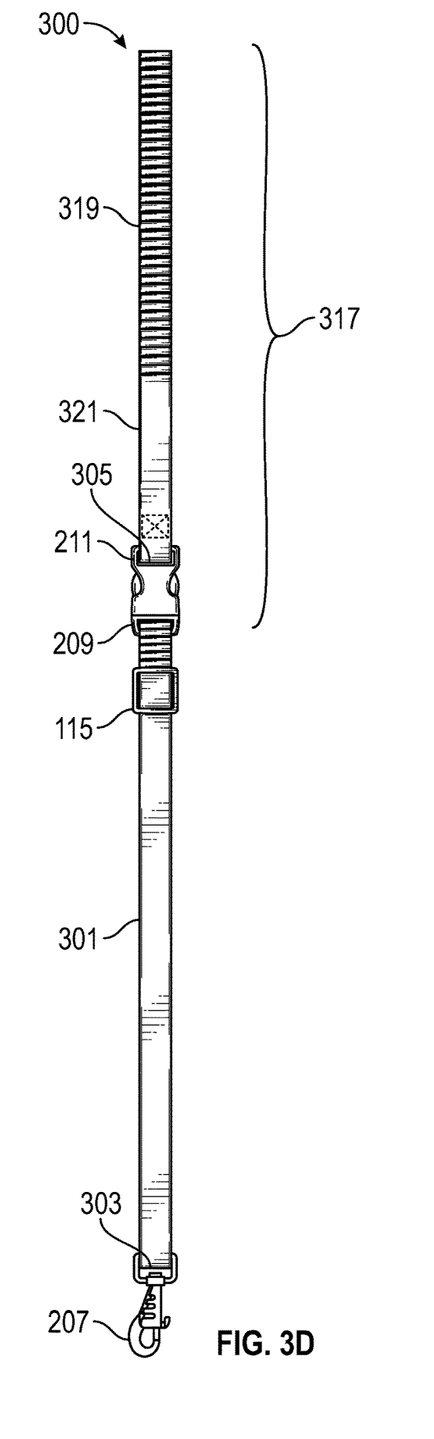
FIG. 3D may depict the leash-with-variable-anchor from FIG. 3A, as viewed from a front view.
Figure 3E:
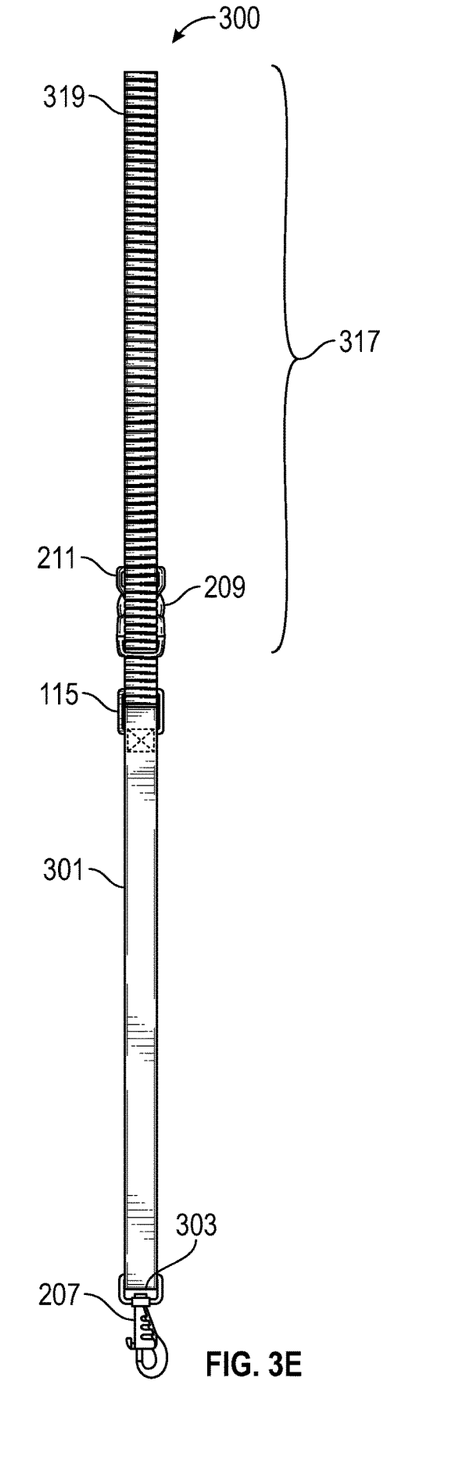
FIG. 3E may depict the leash-with-variable-anchor from FIG. 3A, as viewed from a back view.
Figure 3F:
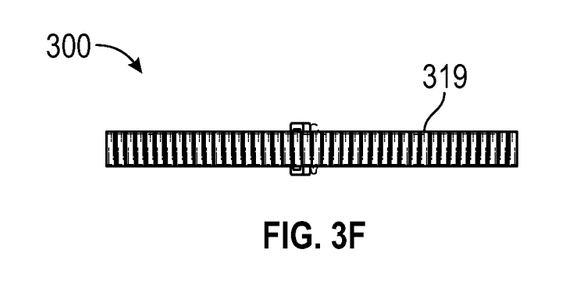
FIG. 3F may depict the leash-with-variable-anchor from FIG. 3A, as viewed from a top view.
Figure 3G:
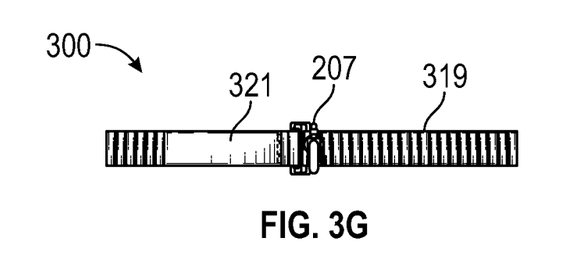
FIG. 3G may depict the leash-with-variable-anchor from FIG. 3A, as viewed from a bottom view.

FIG. 3A may depict an embodiment of a leash-with-variable-anchor 300, as viewed from a perspective view. FIG. 3B may depict leash-with-variable-anchor 300, as viewed from a left-side view. FIG. 3C may depict leash-with-variable-anchor 300, as viewed from a right-side view. FIG. 3D may depict leash-with-variable-anchor 300, as viewed from a front view. FIG. 3E may depict leash-with-variable-anchor 300, as viewed from a back view. FIG. 3F may depict leash-with-variable-anchor 300, as viewed from a top view. FIG. 3G may depict leash-with-variable-anchor 300, as viewed from a bottom view.

In some embodiments, leash-with-variable-anchor 300 may comprise an anchor 317 that may be a closed loop handle region that may be removably openable via use of fastener-hardware. In some embodiments, a portion of anchor 317 may be elastic (e.g., elastic-elongate-member 319). In some embodiments, anchor 317 may removably receives a portion of the article (e.g., article 905, tree trunk 903, or the like) such that leash-with-variable-anchor 300 may be removably anchored to the article. In some embodiments, in physical communication with anchor 317 may be an elongate-member 301. In some embodiments, portions of elongate-member 301 may function as a traditional dog leash. In some embodiments, elongate-member 301 may terminate in a first-terminal-end 303. In some embodiments, firstterminal-end 303 may be removably attachable to a pet 901 via first-fastener 207; wherein first-fastener 207 may be attached to first-terminal-end 303. See e.g., FIG. 3A, FIG. 3B, FIG. 3C, FIG. 3D, FIG. 3E, FIG. 3F, FIG. 3G, FIG. 4, and FIG. 5. For example, and without limiting the scope of the present invention, pet 901 may be a dog, but may also be other types of pets or animals that may utilize collars (e.g., collar 907) and/or harnesses.

In some embodiments, leash-with-variable-anchor 300 may comprise: elongate-member 301, first-terminal-end 303, a second-terminal-end 305, elastic-elongate-member 319, and a handle-member 321. In some embodiments, first-terminal-end 303 may be disposed opposite of second-terminal-end 305. In some embodiments, elongate-member 301 may be substantially elongate. In some embodiments, elongate-member 301 may be webbing or strapping. In some embodiments, such webbing or strapping may be synthetic (e.g., nylon, polyether, acrylic, polypropylene, and/or the like); natural (e.g., cotton, hemp, leather, and/or the like); or combinations thereof. In some embodiments, elongate-member 301 may be substantially non-elastic. In some embodiments, elongate-member 301 may be substantially flat, planar, and flexible. In some embodiments, elastic-elongate-member 319 may be substantially elongate and elastic. In some embodiments, elastic-elongate-member 319 may be elastic webbing or elastic strapping. In some embodiments, elastic-elongate-member 319 may be substantially flexible. For example, and without limiting the scope of the present invention, in some embodiments, elastic-elongate-member 319 may be made from Tetoron webbing or Tetoron like webbing. In some embodiments, handle-member 321 may be substantially elongate. In some embodiments, handle-member 321 may be webbing or strapping. In some embodiments, such webbing or strapping may be synthetic (e.g., nylon, polyether, acrylic, polypropylene, and/or the like); natural (e.g., cotton, hemp, leather, and/or the like); or combinations thereof. In some embodiments, handle-member 321 may be substantially non-elastic. In some embodiments, handle-member 321 may be substantially flat, planar, and flexible. See e.g., FIG. 3A, FIG. 3B, FIG. 3C, FIG. 3D, FIG. 3E, FIG. 3F, and FIG. 3G.

In some embodiments, elongate-member 301 may be about 39 inches in length, plus or minus six inches. In some embodiments, elastic-elongate-member 319 may be about 32 inches in length plus or minus six inches. In some embodiments, handle-member 321 may be about seven inches in length plus or minus two inches. In some embodiments, these elements may have other predetermined length dimensions.

In some embodiments, a ratio of length of elongate-member 301 to a total length of leash-with-variable-anchor 300 may be 0.50. In some embodiments, a ratio of length of elastic-elongate-member 319 to the total length of leash-with-variable-anchor 300 may be 0.41. In some embodiments, a ratio of length of handle-member 321 to the total length of leash-with-variable-anchor 300 may be 0.09. Such ratios may be desirable in providing for optimal balance between traditional leash functions and variable anchor functions.

In some embodiments, a ratio of length of elongate-member 301 to a total length of leash-with-variable-anchor 300 may be from 0.40 to 0.60. In some embodiments, a ratio of length of elastic-elongate-member 319 to the total length of leash-with-variable-anchor 300 may be from 0.35 to 0.45. In some embodiments, a ratio of length of handle-member 321 to the total length of leash-with-variable-anchor 300 may be from 0.05 to 0.15. Such ratios may be desirable in providing for optimal balance between traditional leash functions and variable anchor functions.

With respect to leash-with-variable-anchor 300, in some embodiments, elastic-elongate-member 319 may be disposed between elongate-member 301 and handle-member 321. In some embodiments, elongate-member 301 may be in physical communication with elastic-elongate-member 319; and elastic-elongate-member 319 may be in physical communication with handle-member 321. See e.g., FIG. 3A, FIG. 3B, FIG. 3C, FIG. 3D, FIG. 3E, FIG. 3F, and FIG. 3G.

In some embodiments, handle-member 321 may be replaced entirely with elastic-elongate-member 319; i.e., handle-member 321, in some embodiments, may be an elastic elongate member similar to elastic-elongate-member 319.

With respect to leash-with-variable-anchor 300, in some embodiments, first-terminal-end 303 may be located at an end of elongate-member 301. In some embodiments, second-terminal-end 305 may be located at an end of handle-member 321. See e.g., FIG. 3A, FIG. 3B, FIG. 3C, FIG. 3D, FIG. 3E, FIG. 3F, and FIG. 3G.

In some embodiments, leash-with-variable-anchor 300 may further comprise fastener-hardware (e.g., second-fastener 209 and second-fastener-receiver 211) for removably attaching second-terminal-end 305 to a portion of leash-with-variable-anchor 300. In some embodiments, when the fastener-hardware (e.g., second-fastener 209 and second-fastener-receiver 211) may permit second-terminal-end 305 to be removably attached to the portion of the leash-with-variable-anchor 300, a loop structure may be formed that may be anchor 317. In some embodiments, anchor 317 may permit removable attachment of leash-with-variable-anchor 300 to the article; e.g., by a portion of the article removably residing within anchor 317. See e.g., FIG. 3A, FIG. 3B, FIG. 3C, FIG. 3D, FIG. 3E, FIG. 3F, FIG. 3G, FIG. 4, and FIG. 5.

In some embodiments, leash-with-variable-anchor 300 further may comprise first-fastener 207 that may be attached to first-terminal-end 305. In some embodiments, first-fastener 207 may permit removable attachment of first-terminal-end 305 to a collar 907 or to a harness; wherein collar 907 or the harness may be worn by the given pet (e.g., pet 901). See e.g., FIG. 3A, FIG. 3B, FIG. 3C, FIG. 3D, FIG. 3E, FIG. 3G, FIG. 4, and FIG. 5.

With respect to leash-with-variable-anchor 300, in some embodiments, elongate-member 301 may be in two layers facing each other. See e.g., FIG. 3B and FIG. 3C. In some embodiments, leash-with-variable-anchor 300 may further comprise size-adjuster 115 that is may be slidingly attached to elongate-member 301. In some embodiments, size-adjuster 115 may permits adjustment of a functional length of elongate-member 301. In some embodiments, size-adjuster 115 may be attached to elongate-member 301, the elasticelongate-member 319, or to handle-member 321. In some embodiments, size-adjuster 115 may be slidingly attached to elongate-member 301, the elastic-elongate-member 319, or to handle-member 321. See e.g., FIG. 3A, FIG. 3B, FIG. 3C, FIG. 3D, FIG. 3E, FIG. 3F, FIG. 3G, FIG. 4, and FIG. 5.

In some embodiments, the fastener-hardware may be a side-release buckle or the like. In some embodiments, the fastener-hardware may comprise second-fastener 209 and second-fastener-receiver 211. In some embodiments, second-fastener 209 and second-fastener-receiver 211 removably attach to each other. In some embodiments, second-fastener-receiver 211 may be attached to second-terminal-end 305 and second-fastener 209 may be slidingly attached to the portion (e.g., to a portion of elastic-elongate-member 319) of leash-with-variable-anchor 300. Because second-fastener 209 may be slidingly attached to the portion of leash-with-variable-anchor 300, a size of anchor 317 may be varied. See e.g., FIG. 3A, FIG. 3B, FIG. 3C, FIG. 3D, FIG. 3E, FIG. 3F, FIG. 3G, FIG. 4, and FIG. 5.

It is expressly contemplated that the positions of second-fastener 209 and second-fastener-receiver 211 may be reversed. In some embodiments, second-fastener 209 may be attached to the second-terminal-end 305 and second-fastener-receiver 211 may be slidingly attached to the portion of the leash-with-variable-anchor 300. Because second-fastener-receiver 211 may be slidingly attached to the portion of leash-with-variable-anchor 300, a size of anchor 317 may be varied. See e.g., FIG. 2 for this configuration as applied to leash-with-variable-anchor 200.

With respect to, leash-with-variable-anchor 300, in some embodiments, when the fastener-hardware may permits second-terminal-end 305 to be removably attached to the portion of leash-with-variable-anchor 300 and anchor 317 may be closed and/or formed, but wherein anchor 317 is not removably receiving the portion of the article, then handle-member 321 may function as a handle and may be removably held by a hand or arm of a user. See e.g., FIG. 3A, FIG. 3B, and FIG. 3C.

Figure 4:
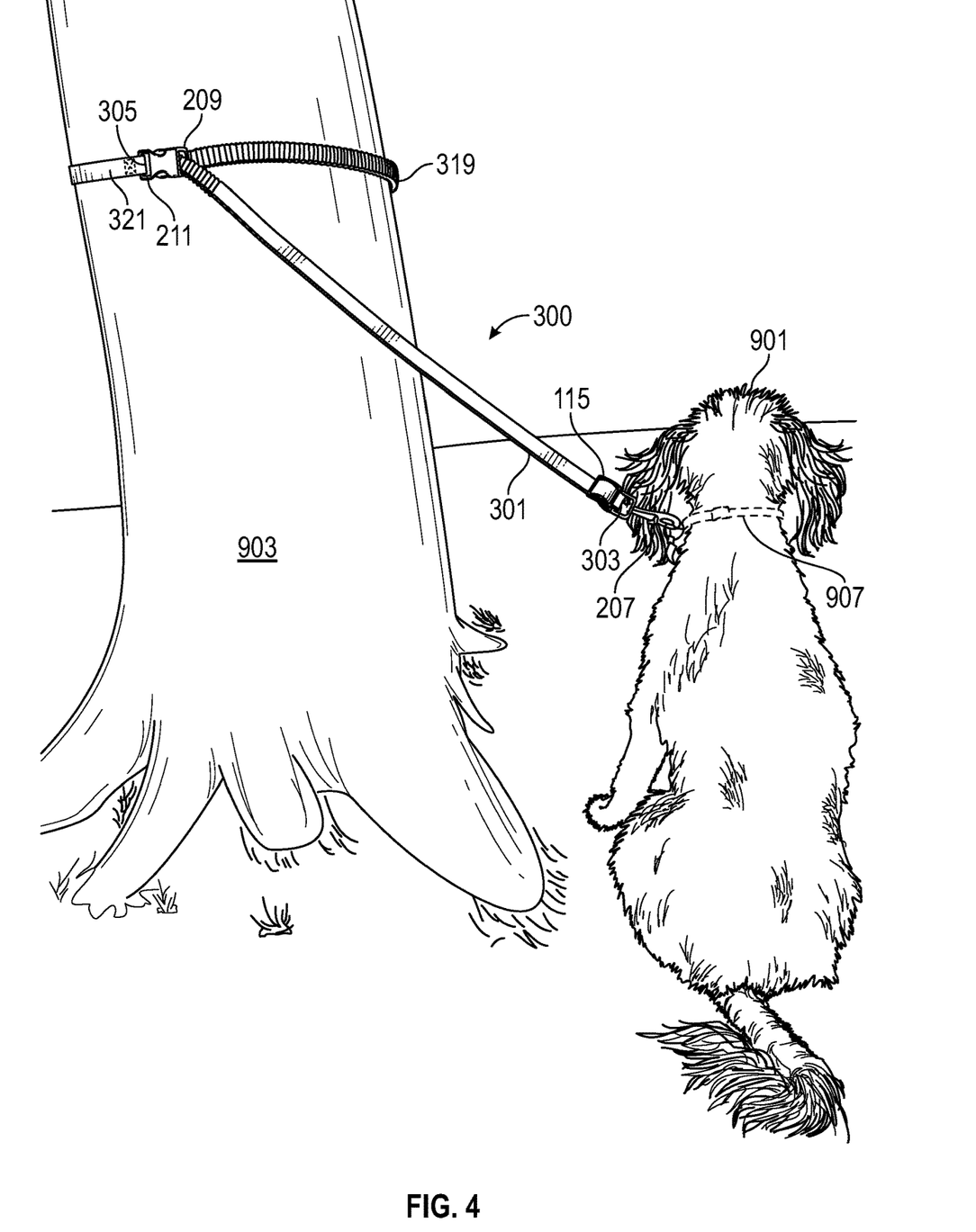
FIG. 4 may depict the leash-with-variable-anchor from FIG. 3A, shown in use, removably attached to an article (e.g., a tree trunk) with relatively large width, diameter, or cross-section.
Figure 5:
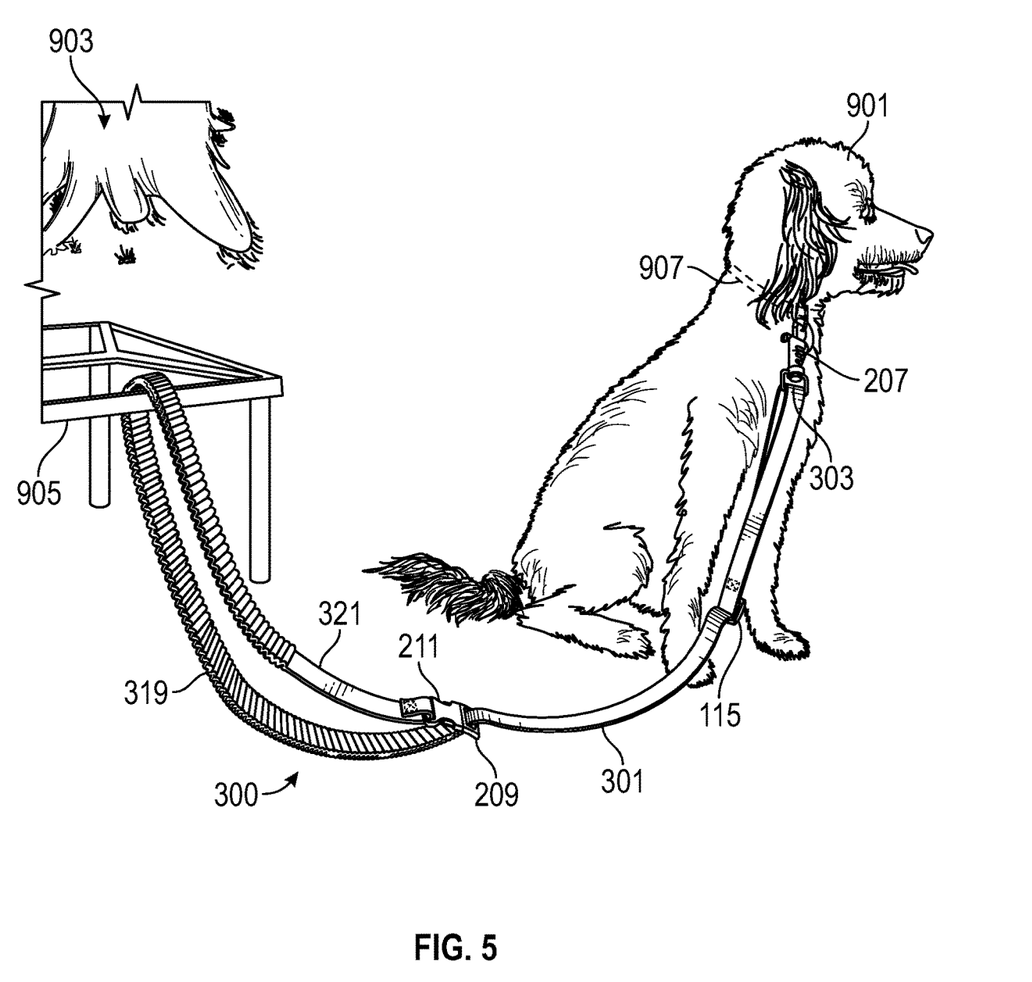
FIG. 5 may depict the leash-with-variable-anchor from FIG. 3A, shown in use, removably attached to an article (e.g., a frame of furniture) with relatively small width, diameter, or cross-section.

With respect to leash-with-variable-anchor 300, in some embodiments, elasticity of elastic-elongate-member 319 may permits anchor 317 to removably receive a portion of different sized articles. See e.g., FIG. 4 and FIG. 5; wherein different sized articles may be shown. FIG. 4 may depict leash-with-variable-anchor 300, shown in use, removably attached to an article (e.g., tree trunk 903) with relatively large width, diameter, or cross-section. Whereas, FIG. 5 may depict leash-with-variable-anchor 300, shown in use, removably attached to article 905 (e.g., a frame of furniture) with relatively small width, diameter, or cross-section.

Figure 6:
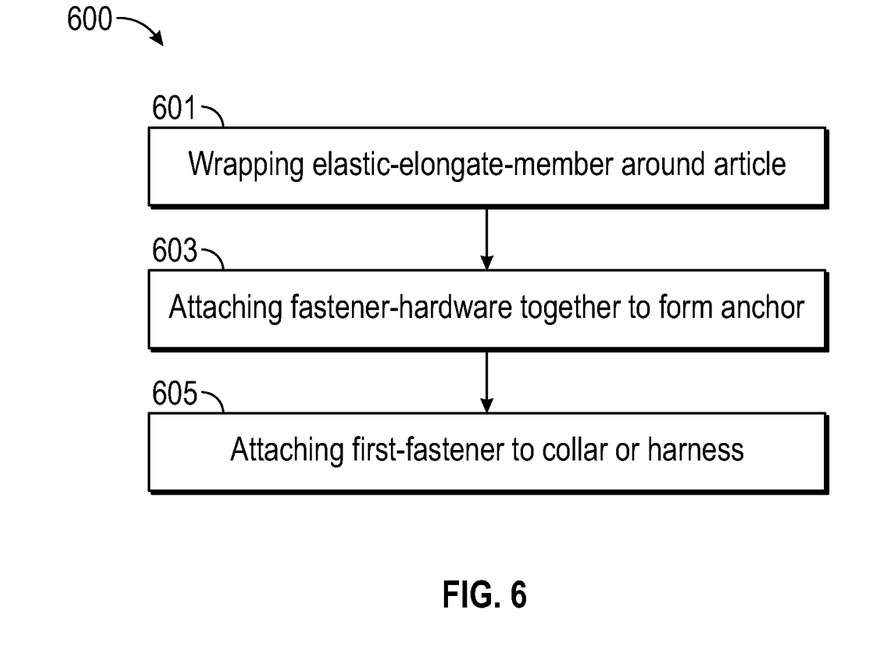
FIG. 6 may depict a method of removably anchoring a pet to an article using a leash-with-variable-anchor.

FIG. 6 may depict a method 600 of removably anchoring a pet (e.g., pet 901) to an article (e.g., article 905 or tree trunk 903) using a leash-with-variable-anchor (e.g., 100, 200, or 300). In some embodiments, method 600 may comprise steps: step 601, step 603, and step 605. In some embodiments, step 603 may follow step 601. In some embodiments, method 600 may begin with step 601 as shown in FIG. 6. In some embodiments, method 600 may be begin with step 605 and then proceed with step 601 and then step 603. In some embodiments, step 601 may be a step of "wrapping elastic-elongate-member around article." In some embodiments, step 601 may entail, wrapping elastic-elongate-member 319 at least partially around a portion of the article and wrapping handle-member 321 around a remaining portion of the article, such that anchor 317 (or 217) may be formed or largely formed. In some embodiments, step 603 may be a step of "attaching fastener-hardware together to form anchor." In some embodiments, step 603 may entail, removably attaching the fastener-hardware together such that anchor 317 (or 217) may be formed or may be closed; wherein the portion of the article may removably reside within anchor 317 (or 217). In some embodiments, step 605 may be a step of "attaching first-fastener to collar or harness." In some embodiments, step 605 may entail, removably attaching first-fastener 207 that may be attached to leash-with-variable-anchor 300 (or 200) to collar 907 or to the harness of pet 901.

Figure 7:
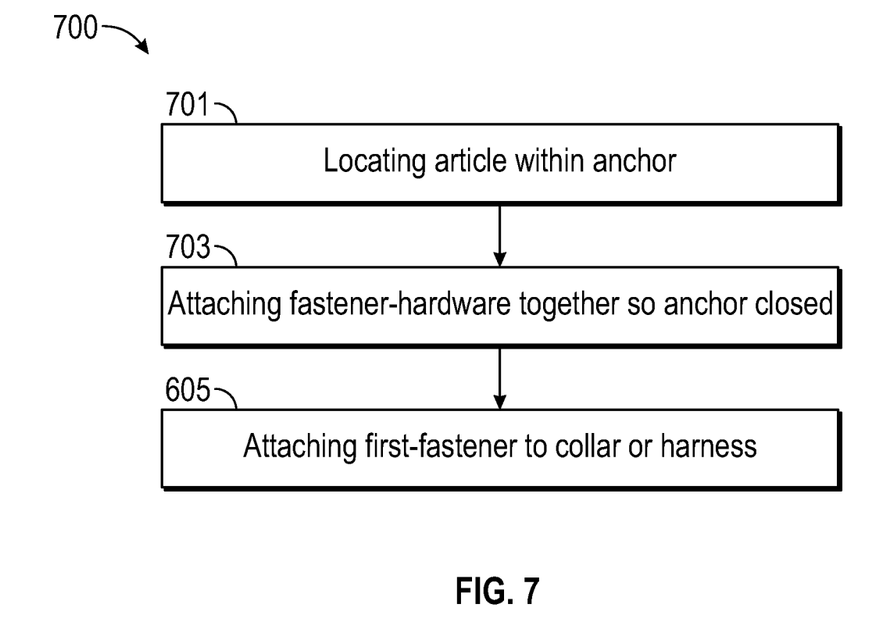
FIG. 7 may depict a method of removably anchoring a pet to an article using a leash-with-variable-anchor.

FIG. 7 may depict a method 700 of removably anchoring a pet (e.g., pet 901) to an article (e.g., article 905 or tree trunk 903) using a leash-with-variable-anchor (e.g., 100, 200, or 300). In some embodiments, method 700 may comprise steps: step 701, step 703, and step 605. In some embodiments, step 703 may follow step 701. In some embodiments, method 700 may begin with step 701 as shown in FIG. 7. In some embodiments, method 700 may be begin with step 605 and then proceed with step 701 and then step 703. In some embodiments, step 701 may be a step of "locating (e.g., placing) article within anchor." In some embodiments, step 701 may entail, locating (e.g., placing) a portion of the article 905 within anchor 317 (or 217) of leash-with-variable-anchor 300 (or 200). In some embodiments, step 703 may be a step of "attaching fastener-hardware together so anchor closed." In some embodiments, step 703 may entail, removably attaching the fastener-hardware together such that anchor 317 (or 217) may be closed and/or formed; wherein the portion of the article may removably reside within anchor 317 (or 217). In some embodiments, step 605 may be a step of "attaching first-fastener to collar or harness." In some embodiments, step 605 may entail, removably attaching first-fastener 207 that may be attached to leash-with-variable-anchor 300 to collar 907 or to the harness of pet 901.

In some embodiments, method 600 and/or method 700 may comprise additional steps, such as sliding the fastener-hardware along a length of the portion of leash-with-variable-anchor 300 to vary a size of anchor 317 (or 217).

Note with respect to the materials of construction, it is not desired nor intended to thereby unnecessarily limit the present invention by reason of such disclosure.

Leashes-with-variable-anchors have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A leash-with-variable-anchor, comprising:
   an elongate-member that functions as a leash, wherein a distal end of the elongate-member terminates in a first-terminal-end, wherein the first-terminal-end is removably attachable to a pet via a first-fastener;
   an anchor that is a closeable same loop handle region that is removably openable via use of fastener-hardware; wherein the anchor is comprised of both an elastic portion and a non-elastic portion that form the same loop handle region; wherein an edge of the elastic portion is shaped in a zig-zag pattern; wherein the elastic portion and the non-elastic portion are directly attached to each other at only one location without use of an intermediary linkage; wherein the anchor terminates at a second-terminal-end; wherein the second-terminal-end is attached to at least a portion of the fastener-hardware; wherein the non-elastic portion is only disposed of between the second-terminal-end and the elastic-portion; wherein the non-elastic portion is attached to the second-terminal-end; wherein the non-elastic portion functions as a handle-member that is configured to be held as a handle; wherein the anchor removably receives a portion of an article such that the leash-with-variable-anchor is removably anchored to the article;

wherein disposed of away from the only one location where the elastic portion and the non-elastic portion are attached to each other, the elastic portion is attached to the elongate-member at a location disposed away from the first-terminal-end.

2. A leash-with-variable-anchor, comprising:
an elongate-member that is substantially elongate and that terminates at a first-terminal-end;
an elastic-elongate-member that is substantially elongate and elastic, wherein an edge of the elastic-elongate-member is shaped in a zig-zag pattern;
a handle-member that is substantially elongate and that is non-elastic, wherein the handle-member terminates at a second-terminal-end; wherein the first-terminal-end and the second-terminal-end are disposed opposite of each other at opposite ends of the leash-with-variable-anchor; and
fastener-hardware that is configured for removably attaching the second-terminal-end to a portion of the leash-with-variable-anchor to form a single loop structure that is designated as an anchor; wherein the anchor permits removable attachment of the leash-with-variable-anchor to an article, by a portion of the article removably residing within the single loop structure, wherein the anchor comprises the handle-member and at least a portion of the elastic-elongate-member that is directly attached to the handle-member at a location designated a second location; and the anchor terminates at the second-terminal-end;
wherein the elongate-member, the elastic-elongate-member, and the handle-member are all separate and distinct structures with respect to each other;
wherein the elongate-member, the elastic-elongate-member, and the handle-member are directly attached in an end to end fashion such that a distal portion of the elongate-member disposed away from the first-terminal-end is directly attached to the elastic-elongate-member at a first location, and distal disposed away from the first location, the elastic-elongate-member is directly attached to the handle-member at the second location, such that the direct attachments at the first location and at the second location are without any intermediary linkages, such that the elastic-elongate-member is only disposed between the elongate-member and the handle-member, such that the elastic-elongate-member is directly attached to both the elongate-member and the handle-member at only two different locations of the elastic-elongate-member, namely, the first location and the second location, wherein the two different locations are separated from each other by a length of the elastic-elongate-member.

3. The leash-with-variable-anchor according to claim 2, wherein a part of the elastic-elongate-member is located outside of the anchor.

4. The leash-with-variable-anchor according to claim 2, wherein the leash-with-variable-anchor further comprises a first-fastener that is attached to the first-terminal-end; wherein the first-fastener permits removable attachment of the first-terminal-end to a collar or to a harness.

5. The leash-with-variable-anchor according to claim 2, wherein the elongate-member is two layers facing each other; wherein the leash-with-variable-anchor further comprises a size-adjuster that is slidingly attached to the elongate-member; wherein the size-adjuster permits adjustment of a length of the elongate-member.

6. The leash-with-variable-anchor according to claim 2, wherein the leash-with-variable-anchor further comprises a size-adjuster that is slidingly attached to the elastic-elongate-member.

7. The leash-with-variable-anchor according to claim 2, wherein the fastener-hardware comprises a second-fastener and a second-fastener-receiver; wherein the second-fastener and the second-fastener-receiver removably attach to each other.

8. The leash-with-variable-anchor according to claim 7, wherein the second-fastener is attached to the second-terminal-end and the second-fastener-receiver is slidingly attached to the portion of the leash-with-variable-anchor.

9. The leash-with-variable-anchor according to claim 7, wherein the second-fastener-receiver is attached to the second-terminal-end and the second-fastener is slidingly attached to the portion of the leash-with-variable-anchor.

10. The leash-with-variable-anchor according to claim 2, wherein elasticity of the elastic-elongate-member permits the anchor to removably receive the portion of the article.

11. The leash-with-variable-anchor according to claim 2, wherein when the fastener-hardware permits the second-terminal-end to be removably attached to the portion of the leash-with-variable-anchor and the anchor is not removably receiving the portion of the article, the handle-member is configured to function as a handle.

12. A method of removably anchoring a pet to an article using a leash-with-variable-anchor, comprising steps of:
(a) wrapping a handle-member and at least a portion of an elastic-elongate-member at least partially around a portion of the article, wherein the handle-member and the elastic-elongate-member are structures of the leash-with-variable-anchor;
(b) removably attaching fastener-hardware of the leash-with-variable-anchor together such that an anchor is formed, wherein the anchor is a single loop structure of the handle-member and of the at least the portion of the elastic-elongate-member; wherein the portion of the article removably resides within the single loop structure; and
(c) removably attaching a first-fastener that is attached to a first-terminal-end of the leash-with-variable-anchor to a collar or to a harness of the pet;
wherein the leash-with-variable-anchor comprises:
an elongate-member that is substantially elongate and that terminates at the first-terminal-end;
the elastic-elongate-member that is substantially elongate and elastic, wherein an edge of the elastic-elongate-member is shaped in a zig-zag pattern;
the handle-member that is substantially elongate and that is non-elastic, wherein the handle-member terminates at a second-terminal-end; wherein the first-terminal-end and the second-terminal-end are disposed opposite of each other at opposite ends of the leash-with-variable-anchor; and the fastener-hardware that is configured for removably attaching the second-terminal-end to a portion of the leash-with-variable-anchor; wherein the anchor permits removable attachment of the leash-with-variable-anchor to the article, by the portion of the article of removably residing within the single loop structure, wherein the anchor comprises the handle-member and the at least the portion of the elastic-elongate-member that is directly attached to the handle-member at a location designated a second location; and the anchor terminates at the second-terminal-end;

wherein the elongate-member, the elastic-elongate-member, and the handle-member are all separate and distinct structures with respect to each other;

wherein the elongate-member, the elastic-elongate-member, and the handle-member are attached in an end to end fashion such that a distal portion of the elongate-member disposed away from the first-terminal-end is directly attached to the elastic-elongate-member at a first location, and distal disposed away from the first location, the elastic-elongate-member is directly attached to the handle-member at the second location, such that the direction attachments at the first location and at the second location are without any intermediary linkages, such that the elastic-elongate-member is only disposed between the elongate-member and the handle-member, such that the elastic-elongate-member is directly attached to both the elongate-member and the handle-member at only two different locations, namely, the first location and the second location, wherein the two different locations are separated from each other by a length of the elastic-elongate-member.

13. The leash-with-variable-anchor according to claim 2, wherein the leash-with-variable-anchor further comprises a size-adjuster that is slidingly attached to the handle-member.

14. The leash-with-variable-anchor according to claim 2, wherein the handle-member is substantially flat, planar, and flexible.

15. The method according to claim 12, wherein the step (c) is executed prior to executing the step (a) or prior to executing the step (b).

* * * * *